United States Patent [19]

Sturgis et al.

[11] Patent Number: 5,049,871
[45] Date of Patent: Sep. 17, 1991

[54] LOOP COMMUNICATION SYSTEM

[75] Inventors: Donald P. Sturgis, Claremont; Michael Wolpert, Los Angeles, both of Calif.

[73] Assignee: American Magnetics Corporation, Carson, Calif.

[21] Appl. No.: 524,682

[22] Filed: May 16, 1990

Related U.S. Application Data

[63] Continuation of Ser. No. 4,964, Jan. 20, 1987, abandoned.

[51] Int. Cl.$^5$ .............................................. H04Q 3/00
[52] U.S. Cl. ......................... 340/825.05; 340/825.01; 370/85.12; 370/85.15
[58] Field of Search .................... 367/20; 340/825.05, 340/825.34, 825.01; 370/15, 16, 85.5, 85.12, 85.15

[56] References Cited

U.S. PATENT DOCUMENTS

| | | | |
|---|---|---|---|
| Re. 28,958 | 9/1976 | Zafiropulo et al. | 340/825.05 |
| 3,859,468 | 1/1975 | Smith et al. | 370/86 X |
| 4,387,425 | 6/1983 | El-Gohary | 370/85 X |
| 4,463,350 | 7/1984 | Kajiura et al. | 340/825.01 |
| 4,542,496 | 9/1985 | Takeyama et al. | 370/16 |
| 4,545,049 | 10/1985 | Kammerer et al. | 340/825.01 |
| 4,553,233 | 11/1985 | Debuysscher et al. | 370/16 |
| 4,554,659 | 11/1985 | Blood et al. | 370/86 |
| 4,633,246 | 12/1986 | Jones et al. | 340/825.05 |
| 4,635,237 | 1/1987 | Benestad et al. | 367/20 |
| 4,683,563 | 7/1987 | Rouse et al. | 370/16 |
| 4,710,915 | 12/1987 | Kitahara | 370/16 |

OTHER PUBLICATIONS

H. D. Toong, "Microprocessors", Scientific American, Sep. 1977, pp. 146, 147, 151, 152, 153, 154, 155, 156, 157, 158, 161.

*Primary Examiner*—Ulysses Weldon
*Attorney, Agent, or Firm*—Herbert M. Shapiro

[57] ABSTRACT

A loop transmission system includes a plurality of micronodes and a central processor operative as a supervisory station linked by two loop transmission lines each capable of transmitting in either direction around the loop. The central processor is adapted to transmit, in alternative cycles in a first then in a second direction about the loop. Each micronode is adapted to respond in a direction opposite to the direction of the command transmission. The system is operative to provide alternative transmission paths in opposite directions around the loop such that if a fault occurs, the system retransmits the prior command in the opposite direction during a next cycle of operation. At most, a one cycle delay occurs, yet the system is inexpensive and easy to install.

8 Claims, 4 Drawing Sheets

LOOP COMMUNICATION SYSTEM

This is a continuation of application Ser. No. 004,964, filed Jan. 20, 1987, now abandoned.

FIELD OF THE INVENTION

This invention relates to a data communication network and more particularly to a multinode data communication network in which each node is coupled into two loops to ensure reliability of the network.

BACKGROUND OF THE INVENTION

Loop or ring data communication networks are well known in the art. It is also well known to provide a double loop for such networks to ensure the availability of a communication path if failure in a node or in a portion of a path should occur. Such systems usually require constant checking of the system to detect for the occurrence of a fault and means for reconfiguring the two loops to form a single loop including a bypass around the fault, should one occur. Thus, under no fault operation, a double data path is provided. But when a fault occurs a local bypass about the fault is provided at the expense of throughput.

U.S. Pat. No. 4,553,233 issued Nov. 12, 1985, and assigned to International Standard Electric Corporation discloses one such system which requires no central processor but a relatively sophisticated node configuration. U.S. Pat. No. 4,542,496 issued Sept. 17, 1985, and assigned to Fujitzu Limited discloses a system of the type which does employ a central processor. In this latter system, the central processor is operative to check for the occurrence of a fault and to switch transmission to the alternative loop if such is available. If a fault occurs in both loops at once, the central processor connects the two loops at the nodes to either side of the fault in order to provide a transmission path.

Prior art systems of this type require fairly expensive node configurations, critical timing, and expensive wiring configurations which limit the use of such systems.

BRIEF DESCRIPTION OF AN EMBODIMENT OF THIS INVENTION

In accordance with the principle of this invention, a data communication network includes first and second loops with a plurality of nodes and a central processor. Local electrical closure between the two loops or communication continuity is provided at each node as a normal occurrence when no faults are detected. Thus, the nodes are connected to the two loops and operated in a manner different from the prior art teachings. A less expensive system which is relatively easy to install is provided.

In one illustrative system, a network includes nodes A, B, C - - - N and a central processor. The network is connected such that commands issued by the processor are sent to a designated node via the string of nodes between the central processor and the receiving node. Thus, a command to node C goes to node A, then to node B and then to node C which transmits the response in a reverse direction about the loop back to the central processor, If the path is broken, say between node A and node B, no node from B on can receive commands. On the other hand, each node includes two separate and independent I/O ports. Consequently, the network is adapted to provide an alternative forward path for both command and response under the control of the central processor. Specifically, the central processor is adapted to direct signals alternatively in a first and then a second direction around the loop, the response to each command being transmitted in a direction opposite to the initiating command.

The network may be adapted to permit polling of all nodes in one direction before reversal of the command direction.

DESCRIPTION OF THE INVENTION

Figure 1:
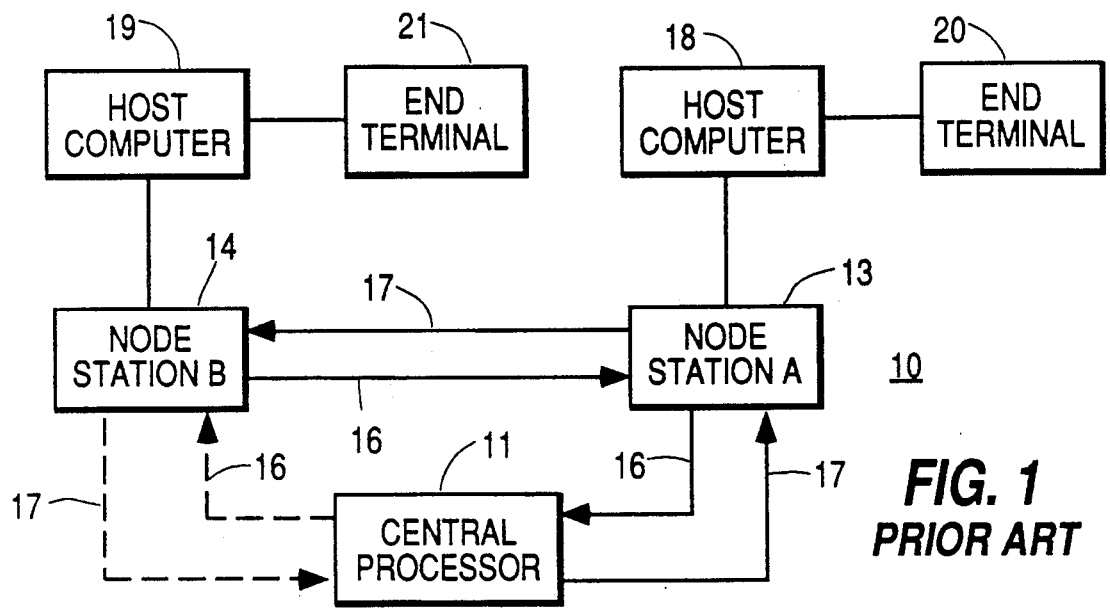
FIG. 1 is a block diagram of a representative prior art loop communication system.

FIG. 1 is a block diagram of a prior art loop transmission system 10. The system 10 includes a central processor 11 operative as a supervisory station. The system 10 also includes a plurality of node stations. The number of node stations may vary. FIG. 1 illustrates two terminals represented by blocks 13 and 14. The stations are interconnected by first and second transmission lines 16 and 17.

The transmission lines interconnect the node stations and the central processor in first and second loop configurations. Transmissions moving counterclockwise and clockwise, respectively, are indicated by the arrows in the loops. Host computers 18 and 19 and end terminals 20 and 21 are connected to node stations 13 and 14, respectively, for initiating data or command inputs. The presence of more than two node stations is indicated by the broken portions of transmission lines between node 14 and central processor 11.

The prior art system 10 is operative under normal conditions such that one of the transmission lines, say 16, is used as an active route, i.e., a "0" route, and the other transmission line is used as a standby route, i.e., a "1" route, If only one of the transmission lines, say 16, becomes faulty at any point, the supervisory station 11 is adapted to detect the fault and switch the transmission line so that line 17 is used as the active route and communication between node stations can be maintained.

If a fault occurs in both transmission lines at once, the supervisory station 11 detects the faults from the condition of the signals on the line. In response to those signals, the supervisory station 11 sends loop commands on both lines. The commands are received by each node still reachable over the active portions of the two transmission lines. Each of such node stations responds to the loop back commands to establish a loop back route utilizing portions of the two transmission lines.

The supervisory station 11 also is adapted to send follow up commands to release the loop back routes and return the loop to normal operation. These follow up commands occur after a predetermined time. Each node for which the receiving condition on each transmission line is normal responds to release the loop back route. In each node station at which a fault is detected in one line, the loop back route is retained, Further operation utilizes portions of the two lines until the fault is repaired.

Figure 2:
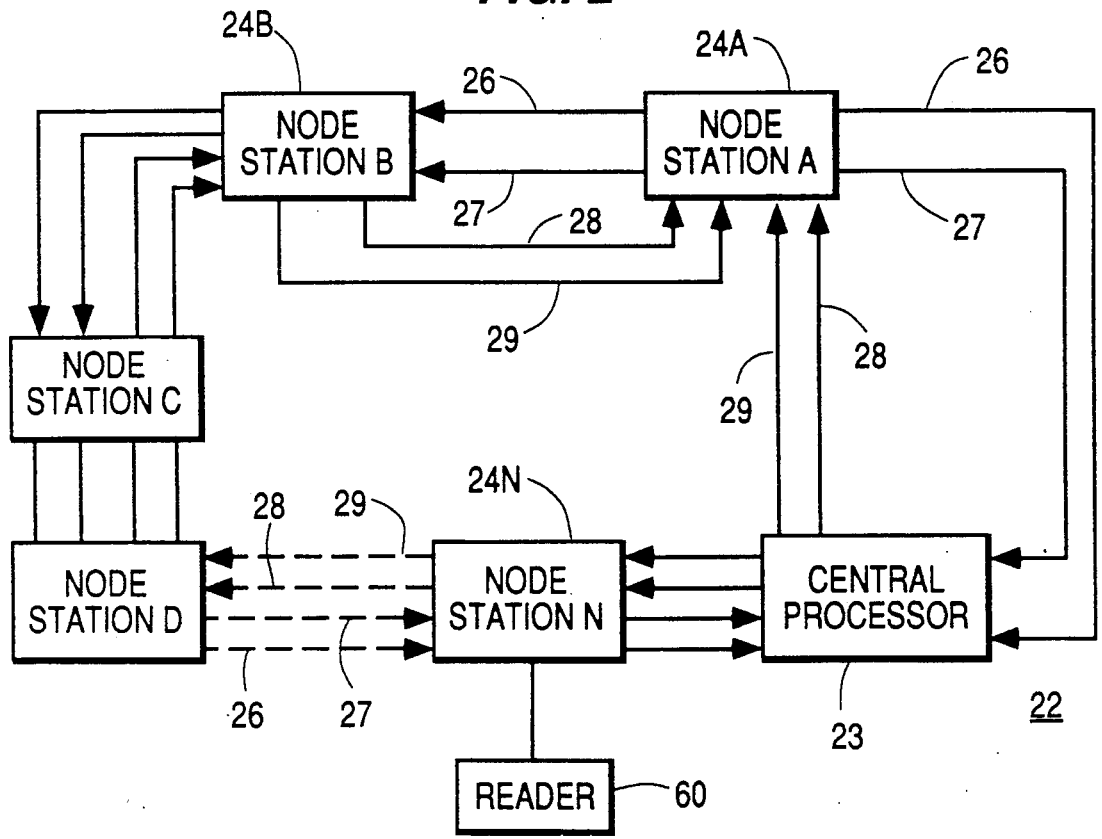
FIGS. 2 and 5 are block diagrams of a loop communication system in accordance with the principle of the invention.

FIG. 2 shows a block diagram of a loop transmission system 22 in accordance with the present invention. As was the case with the system 10 of FIG. 1, the system 22 includes a central processor 23 and a plurality of node stations.

A plurality of representative node stations are represented by blocks 24A, 24B - - - 24N in FIG. 2. The presence of additional stations is indicated in FIG. 2 by broken lines 26 and 27, and lines 28 and 29. The broken line 26 through 29 are segments of transmission lines (with like designations) which link the node stations and the central processor 23. It is to be understood that the central processor 23 communicates receives as well as transmits, to the node stations in two directions (clockwise and counterclockwise) as is indicated by the arrows in lines 26–29. Each transmission line includes a twisted pair of lines to permit such operation.

In accordance with the principles of the present invention, the central processor 23 is adapted to alternate the direction in which commands are transmitted. All commands, once initiated, proceed from one node to the next consecutive node in the direction in which the transmission was initiated. But the response to the command is transmitted from the node which was the intended destination of the command back to the source in the direction opposite to the original direction of the command transmission.

If a transmission line is broken (i.e., a fault occurs between say node station 24A and node station 24B), no node stations beyond 24A can receive transmissions. But the system 22 provides for two independent directions of transmission from the central processor 23. Thus, another line is provided for both commands and responses. That is to say, if a command is retransmitted in the opposite direction during the next cycle of operation. During the following cycle, a path exists, free of faults, for a response the be communicated to the central processor. The system thus compensates for the occurrence of a fault by providing alternative communication paths in alternative communication directions. The occurrence of a fault thus results in the recommunication of a command and a response, both delayed one cycle of operation.

A cycle of operation need not be limited to including a single command and response. It may be defined as including two, three, or more commands and responses. For systems with relatively few nodes, a cycle of operation may include a period in which all nodes are polled. Reversal of the direction of command flow about the loop in this case occurs after all nodes are polled.

Figure 3:
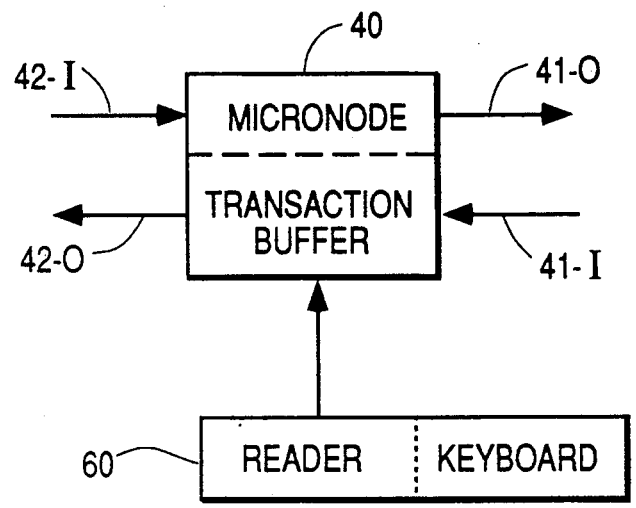
FIGS. 3 and 4 are block diagrams of a node and a central processor in the network of FIG. 2.
Figure 4:
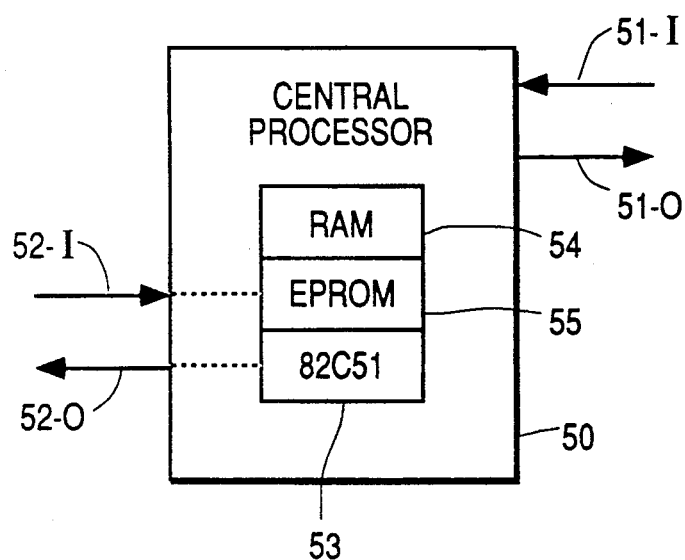

FIGS. 3 and 4 show circuit diagrams of an illustrative micronode and central processor organization, respectively. FIG. 3 shows a block 40 representing an illustrative micronode. The micronode has input/output ports 41-I and 41-O to the right of the block as viewed and 42-I and 42-O to the left. Any command sent by the central processor and received by a micronode at an input port (41-I or 42-I) is retransmitted by the micronode via the opposite output port (42-O or 41-O). This operation continues until the target micronode is reached.

The targeted micronode operates differently. When that micronode receives a message intended for it, it responds on the output port corresponding to the input port at which the message was received. In this manner, the response is returned, micronode by micronode in a direction around thee loop opposite to that in which the original command was directed. The response is ultimately applied to the output port associated with the input port of the central processor at which the command originated.

FIG. 4 shows a block 50 representing a central processor. Any comparable based computer, the IBM-XT or compatible computer is suitable as, for example, the Epson Equity II. Such a computer operating under MS-DOS defines an I-O pair commonly called a COM-port. The loop configuration of FIG. 4 requires two such COM-ports. Consequently, a central processor in accordance with the present invention also includes a means for defining such a second COM-port. An Intel 82C51 chip is suitable for this purpose. The COM ports are designated 51-I and 51-O and 52-I and 52-O in FIG. 4. The means for defining the second COM-port is designated 53.

The central processor also includes RAM memory 54 for storing data and transactions as well as an EPROM 55 for storing firmware for the operative system. The micronode 40 of FIG. 3 and the central processor 50 of FIG. 4 are interconnected into the loop network of FIG. 2 in a straightforward manner which becomes clear once it is understood that each arrow (i.e. 51-O of FIG. 5) represents a connection to a pair of wires (i.e., 28 and 29 exiting central processor 23 of FIG. 2.)

A reader 60 of FIG. 3, shown also in FIG. 2 connected to Node station N, is adapted to read magnetic stripe cards. The data on the card identifying the use is entered into the transaction buffer of that Node Station. A keyboard (not separately shown) is present at each node station and may be included as part of reader 60 for entering a personal identification number which is also stored in the transaction buffer of the node station. The node station includes sufficient intelligence to respond locally to inputs from a reader and keyboard independently of the control of the central processor. That is to say, a micronode, for example, is adapted to permit entry of a card bearer when proper identification is entered according to stored criteria which are familiar in the art. The central processor is adapted to update its database, interrogate the micronodes for an update on transaction and for changing entry criteria.

A communication protocol description for various commands and responses in a loop communication network in accordance with the principles of this invention is included herein below. A communication protocol also is included below. Several sample commands and responses consistent with that protocol are as follows:

| SAMPLE COMMANDS from COMPUTER | Symbol for # of Data Chars CMD | DATA | DESCRIPTION |
| --- | --- | --- | --- |
| SEND A microNODE TRANSACTION | 'MT | | |
| ADD a CARD TO READER MEMORY | .CA | CCCCCCTTPPPP | CC = Card Number 000000-999999 TT = Time Code |

|   |   |   |   |
|---|---|---|---|
|   |   |   | 01–63<br>PPPP=PIN<br>Number<br>0000–9999 |
| SAMPLE<br>RESPONSES from<br>MICRONODE | Symbol for #<br>of Data Chars<br>RSP | DATA | DESCRIPTION |
| CARD<br>TRANSACTION | CT | CCCCCADTTTT | CC=Card Number<br>000000–999999<br>A=Activity<br>Code *<br>D = Day Code<br>1–7<br>TTTT = Time<br>0000–2359 |
|   | * {V = | VALID transaction | } |
|   | {X = | wrong Customer Code | } |
|   | {U = | UNKNOWN card | } |
|   | {T = | wrong TIME | } |
|   | {P = | PIN entry error | } |
|   | {Z = | Card Number deleted,<br>excessive PIN errors | } |

SAMPLE #1
Complete message from computer that addresses micro NODE 03 and adds card
number 894950 with a time code of 03 and pin number of 7654 follows:
    B0399,CA894950037654FB
              B9903"CA83    {Response from microNODE}
SAMPLE #2
A computer request for a micro NODE transaction, with the microNODE responding
with a valid card transaction, show that card 894950 was granted access to reader 03
on Tuesday at 12:47

The network can be seen to be operative to accept entry requests at a reader controlled independently by a micronode, consecutive transactions being stored in a micronode transaction buffer. The central processor transfers transaction information periodically. If a new transaction occurs before space is provided for it in a transaction buffer, the buffer is adapted to accept the new data and destroy the oldest data in the buffer.

It is to be remembered, that the central processor sends commands to a designated micronode in one direction about the loop. The response returns in the opposite direction. It is also to be remembered that the direction of command transmission reverses every cycle as does the direction of the response. It is clear that a command is transmitted from node to node to the target node via an input port and opposite output port of each node between the central processor and the target node. That is to say, during one cycle a command proceeds around the loop via input port 41-I and output port 42-O as shown in FIG. 3 of each micronode between the central processor and the target micronode. The response from the target micronode proceeds via input Port 42-I and output port 41-O of each micronode between the target micronode and the central processor.

Figure 5:
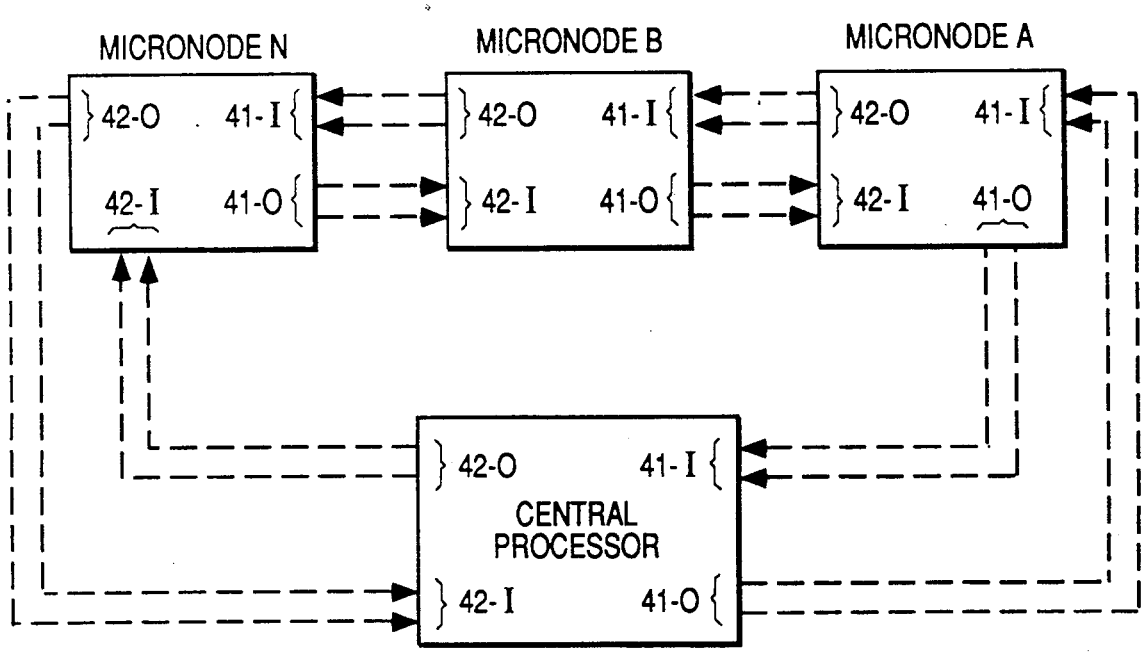

During a next cycle of operation a command from the central processor is sent in the opposite direction about the loop from output port 52-O of FIG. 4. The command during this cycle is transmitted via input port 42-I and output port 41-O or each micronode between the central processor and the target micronode. The response returns via input port 41-I and 42-O of each micronode between the target micronode and the central processor, being applied to input port 52-I of the central processor as shown in FIG. 4. Central processor 50 is adapted to reverse the direction of commands and responses in consecutive cycles. EPROM 55 of FIG. 4 is coded to require such operation. FIG. 5 shows how the node and central processor ports are interconnected in the network of FIG. 2.

Figure 6:
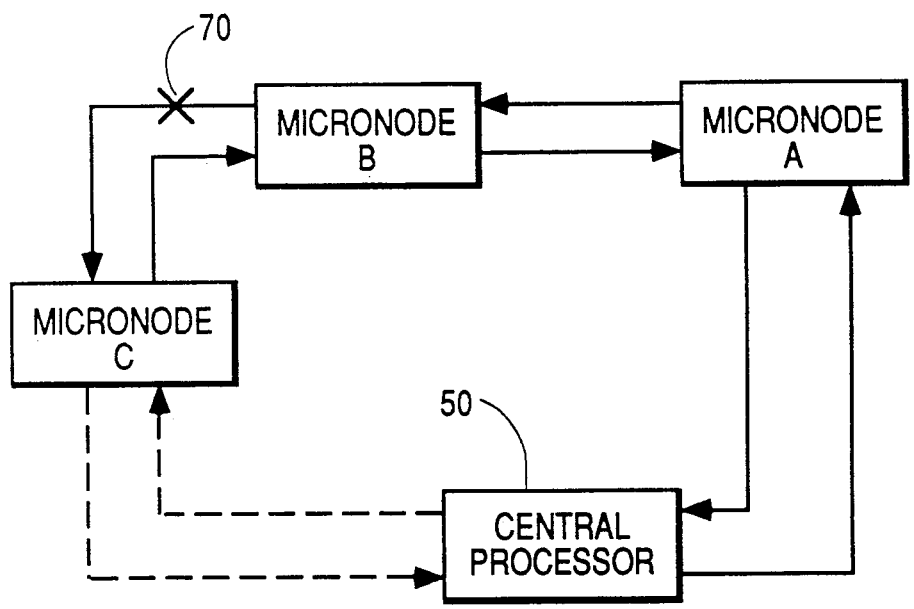
FIG. 6 is a block diagram of a loop communication system of FIG. 2 in which a fault occurs.

FIG. 6 illustrates a loop network with a fault in the loop between micronode B a a d micronode C as indicated with and C designated 70. A command sent to micronode C via micronodes A and B during a given cycle will not arrive at C and an expected response from micronode C during that cycle will not be received. Instead, the central processor receives, for example, a string of zeroes which may be adapted to produce a "fault" report. During a next cycle, the same command is sent to micronode C via output port 52-O as shown in FIG. 4. No fault exists in the loop in this direction. Consequently, an acceptable response is received at input port 52-I of the central processor during the response phase of that next cycle. The presence of a fault in the line has merely delayed communication to the micronode at most by one cycle of operation.

On the average, any micronode will receive commands fifty percent of the time from one direction around the loop and fifty percent of the time in the other direction. If a fault occurs, still fifty percent of the time, no delay will be encountered. In only the other fifty percent will a one cycle delay occur. Thus, on the average, less than one cycle delay occurs when a fault is encountered.

Although, the present system is designed for access control where independent micronodes are adapted to control access even when communication with a central processor is interrupted, communication is sufficiently fast for the system to be adapted for alarm control as well. Each cycle of operation has a duration of at most, 33 milliseconds of only 330 milliseconds even if a cycle of operation is defined to include the polling of say ten nodes. Thus, the occurrence of a fault causes an average delay of less than 160 milliseconds which is sufficiently fast to be adapted for alarm control.

Communication Protocol Description

The communication protocol for computer-to-microNODE is structured for a system that consists of a number of interconnected intelligent microNODES operating in real time. It is based on a command/response mode, where a microNODE will not transmit a message unless it first receives one from the computer.

Up to 32 microNODEs may be connected to a computer in a 4-wire, 20-milliamp current loop ring arrangement, as links in a chain. Each end of the chain may be connected to a separate input/output port in the computer to provide a redundant communication path. A message may be initiated from either port and sent in either direction around the ring; however, communications must be only in one direction at a time. All messages arriving at one of the two microNODE input ports is moved to the opposite output and forwarded on to the next microNODE. In this manner, a message sent by the computer will travel the entire loop and return to the computer at its opposite input/output port.

A microNODE always initiates a response message to any incoming message that contains its address. A microNODE returns its response message to the computer on the output port associated with the input port receiving the computer message. This response is received by the next microNODE in the loop and is passed on until it is received by the computer. Therefore, the computer receives an answer to its message only at the initiating input/output port.

A message to and from the microNODE has the same structure of three sections: —HEADER, DATA, and CHECK SUM CHARACTERS.

The HEADER consists of the following six characters:

Start of text character—STX (02 Hex)
Destination address—two-characters
  The encoder address is always 00.
  The microNODE address is set by DIP switches in the microNODE. These are ODD numbers only; 1, 3, ... 63.
  Reader addresses are 01 to 64. Two readers may be connected to a microNODE. The first reader address is the same as the microNODE; the second reader address is the next higher EVEN address.
  All microNODEs and readers also respond to the global address 99.
Source address—two characters
  An encoder, reader and microNODE will only respond to messages from a source address of 99, the computer address.
Number of DATA characters to follow—one character
  This character is N+20 (Hex)
  where: N (Hex)=number of DATA characters to follow

EXAMPLE

If there are 15 DATA characters, N=F (Hex) the character is 2F (Hex) and prints as /(ASCII)

The DATA section of the message varies in length from a minimum of 2 characters to a maximum of 94 characters. The first two characters are always identifying command/response characters which indicate the meaning of the rest of the data to the receiving unit.

The CHECK SUM CHARACTERS are the last two characters of a message. The check sum is a single byte two's complement binary sum (ignoring carries) of all of the preceding message characters. This eight-bit check sum is read as two hexadecimal characters that are converted to two printable ASCII Check Sum Characters (0 through 9, A through F).

EXAMPLE

The message to unlock door (reader) number 3 should contain the following ASCII characters: (STX)0399"UD6E Data is transmitted or received in 10-bits-per-ASCII-character asynchronous strings, at 1200 or 9600 Baud (selected by a jumper in the microNODE).

Each character has:
one start bit
eight data bits (8th bit, parity bit=0)
one stop bit.

All characters in the string, except the STX character, are printable ASCII characters.

A microNODE stores and operates on its own access control data base that has been down-loaded to it by the computer. All card transactions performed by the microNODE and all changes-of-state of monitored contacts are stored in a transaction buffer in the microNODE. The microNODE transmits these buffered transactions, one-per-command, in response to the following computer commands:

send microNODE ALARMS (MA)
READER TRANSACTIONS (RT)
or microNODE TRANSACTIONS (MT).

If the microNODE's transaction buffer is empty when it receives any of the above commands it responds with a "NO ACTIVITY TO REPORT" (ZZ) message.

Another way for the computer to check if the microNODE has anything to report is to send a "microNODE STATUS" (MS) request. One of the data characters in the microNODE response indicates the status of the transaction buffer (EMPTY, <75% full, >75% full, and FULL) and another character indicates whether an ALARM message is pending.

COMMUNICATION PROTOCOL
(All characters are standard ASCII and printable with the exception of the STX character)

COMPUTER ---> MICRONODE

| STX | 00 to 99 DESTINATION | 9 9 SOURCE ADDR | No of Data Chars 0 - Z 0 - Z | COMMAND | <------ UP TO 94 DATA CHARACTERS ------> ALPHANUMERIC DATA | CKCC |
|---|---|---|---|---|---|---|

TERMINAL ---> MICRONODE [See note at bottom of page]

| STX | 00 to 99 DESTINATION | 9 9 SOURCE ADDR | Space Hex 20 0 - Z 0 - Z | COMMAND | <------ UP TO 94 DATA CHARACTERS ------> ALPHANUMERIC DATA | CR |
|---|---|---|---|---|---|---|

| COMMANDS from COMPUTER | Symbol for # of Data Chars | CMD | DATA | DESCRIPTION | |
|---|---|---|---|---|---|
| CARD COMMANDS | | | | | |
| @ ADD a CARD (to ONE Reader) | . | CA | CCCCCCTTPPPP | CC = Card Number TT = Time Code PPPP = PIN Number | 000000-999999 01-63 0000-9999 |
| ADD a Card (to BOTH Readers in Micronode) | . | CB | CCCCCCTTPPPP | CC = Card Number TT = Time Code PPPP = PIN Number | 000000-999999 01-63 0000-9999 |
| @ DELETE a CARD (from ONE Reader) | ( | CD | CCCCCC | CC = Card Number | 000000-999999 |
| DELETE a Card (from BOTH Readers in Micronode) | ( | CE | CCCCCC | CC = Card Number | 000000-999999 |
| ZERO (Clear) entire CARD Memory | $ | CZ | ZZ | Z = letter Z | |
| ANTIPASSBACK | | | | | |
| Set one CARD OUT | ( | CO | CCCCCC | CC = Card Number | 000000-999999 |
| Set one CARD IN | ( | CI | CCCCCC | | |
| Set one CARD NEUTRAL | ( | CN | CCCCCC | | |
| ALL Cards OUT | " | AO | | | |
| ALL Cards IN | " | AI | | | |
| ALL Cards NEUTRAL | " | AN | | | |

NOTE: When the sixth character (No. of data characters field) is a "Space" the Micronode does not count succeeding characters. It continues to receive data until a "Carriage Return" (CR) character is received. The Micronode ignores any Space characters that may be interspersed among the data characters. A "Delete" (Del) or "Back Space" character will cause the Micronode to ignore the preceding data character.

| COMMANDS from COMPUTER | Symbol for # of Data Chars | CMD | DATA | DESCRIPTION | |
|---|---|---|---|---|---|
| TIME CODE COMMANDS | | | | | |
| ADD a TIME Code | . | TA | TTxySSSSssss | TT = Time Code xy = Active Days SSSS = Start Time ssss = Stop Time | 01-63 (see table) 0000-2359 0000-2359 |

| x | Mon Tue Wed Thu | y | Fri Sat Sun Hol |
|---|---|---|---|
| 0 | - - - - | 0 | - - - - |
| 1 | Mon - - - | 1 | Fri - - - |
| 2 | - Tue - - | 2 | - Sat - - |
| 3 | Mon Tue - - | 3 | Fri Sat - - |
| 4 | - - Wed - | 4 | - - Sun - |
| 5 | Mon - Wed - | 5 | Fri - Sun - |
| 6 | - Tue Wed - | 6 | - Sat Sun - |
| 7 | Mon Tue Wed - | 7 | Fri Sat Sun - |
| 8 | - - - Thu | 8 | - - - Hol |
| 9 | Mon - - Thu | 9 | Fri - - Hol |
| A | - Tue - Thu | A | - Sat - Hol |
| B | Mon Tue - Thu | B | Fri Sat - Hol |
| C | - - Wed Thu | C | - - Sun Hol |
| D | Mon - Wed Thu | D | Fri - Sun Hol |
| E | - Tue Wed Thu | E | - Sat Sun Hol |
| F | Mon Tue Wed Thu | F | Fri Sat Sun Hol |

| | | | | |
|---|---|---|---|---|
| DELETE a TIME Code | $ TD | TT | TT = Time Code | 01-63 |
| ZERO (Clear) all TIME Codes | $ TZ | ZZ | Z = letter Z | |

HOLIDAY FILE COMMANDS

| | | | | |
|---|---|---|---|---|
| ADD a HOLIDAY | & HA | MMDD | MM = Month<br>DD = Day | 01-12<br>01-31 |
| DELETE a HOLIDAY | & HD | MMDD | MM = Month<br>DD = Day | 01-12<br>01-31 |
| ZERO (Clear) entire HOLIDAY File | $ HZ | ZZ | Z = letter Z | |

| COMMANDS from COMPUTER | Symbol for # of Data Chars | CMD | DATA | DESCRIPTION |
|---|---|---|---|---|

MONITOR CONTACT POINTS

| | | | | |
|---|---|---|---|---|
| SET Monitor POINT Alarm State | * | SP | 12345678 | 1 (Pt.1) .... 8 (Pt.8)<br>1 - 8 = O for OPEN contact is alarm state<br>= C for CLOSED contact is alarm state<br>= B for BOTH open/closed are alarm states<br>= N for this point is NOT an alarm |
| DISABLE Monitor POINTS | * | DP | 12345678 | 1 (Pt.1) .... 8 (Pt.8)<br>1 = Disable Pt. 1<br>- = leave Pt. 1 unchanged<br>: : : : :<br>8 = Disable Pt. 8<br>- = leave Pt. 8 unchanged |
| ENABLE Monitor POINTS | * | EP | 12345678 | 1 (Pt.1) .... 8 (Pt.8)<br>1 = Enable Pt. 1<br>- = leave Pt. 1 unchanged<br>: : : : :<br>8 = Enable Pt. 8<br>- = leave Pt. 8 unchanged |

LOGIC DEFINITIONS

| | | | | |
|---|---|---|---|---|
| @ SET LOGIC Definitions | . | SL | VIUTPZAFOCSN | To set a function enter letter in proper position.<br>Upper case letter = function is an ALARM<br>Lower case letter = function is an EVENT<br>- = leave unchanged<br>V = VALID Card Transaction<br>I = Wrong Customer Code<br>U = UNKNOWN Card<br>T = Card used at wrong TIME<br>P = Wrong PIN entered<br>Z = Card Number deleted, excessive PIN errors<br>A = ANTIPASSBACK violation<br>F = Door FORCED open<br>O = Door OPEN too long<br>C = Door CLOSED<br>S = Tamper SWITCH Open<br>N = Tamper Switch NORMAL (Closed) |

| | | | | |
|---|---|---|---|---|
| @ | DISABLE LOGIC Functions | . DL | VXUTPZAFOCSH | To disable a function, enter letter in proper position<br>- = leave unchanged |
| @ | ENABLE LOGIC Functions | . EL | VXUTPZAFOCSH | To enable a function, enter letter in proper position<br>- = leave unchanged |

| COMMANDS from COMPUTER | Symbol for # of Data Chars | CMD | DATA | DESCRIPTION |
|---|---|---|---|---|

SYSTEM SETUP COMMANDS

| | | | | |
|---|---|---|---|---|
| | Set CUSTOMER CODE | ( CC | CCCCCC | CC = Customer Code  000000 - 999999 |
| | SET CALENDAR/CLOCK | - SC | YYMMDDWHHmm | YY = Year (19)85-(20)84<br>MM = Month 01-12<br>DD = Day 01-31<br>W = Day-of-week 1=Monday, 2=Tuesday, etc.<br>HH = Hours 00-23<br>mm = Minutes 00-59 |
| @ | Set DOOR TIMES | & DT | UUOO | UU = Unlock time 01-99 secs<br>OO = Open time 01-99 secs |

| Symbol | Hex Code | # of Chars |
|---|---|---|
| " | 22 | 2 |
| $ | 24 | 4 |
| % | 25 | 5 |
| & | 26 | 6 |
| ' | 27 | 7 |
| ( | 28 | 8 |
| * | 2A | 10 |
| , | 2C | 12 |
| - | 2D | 13 |
| . | 2E | 14 |
| / | 2F | 15 |

NOTE: a) Each reader recognizes two different "Reader Addresses";
   1) its own unique address
   2) a "Global" address, 99, that is common to all readers.
      This latter address allows ALL system readers or Micronodes to respond to
      a single command sent by the computer.
   b) Each reader address character is an ASCII character 0-9.
      Only reader addresses 00 thru 63 are currently used.
   c) Two readers may be connected to a Micronode. Reader "A" responds to an ODD address (set by DIP switches)
      and Reader "B" responds to the next higher EVEN address. The Micronode responds to either address.
   d) "@" indicates commands to Readers. All other commands are to Micronodes.

| COMMANDS from COMPUTER | Symbol for # of Data Chars | CMD | DATA | DESCRIPTION |
|---|---|---|---|---|
| DOOR CONTROL | | | | |
| @ GRANT ACCESS (Momentary operate) | " | GA | | |
| @ UNLOCK DOOR (On) | " | UD | | |
| @ LOCK DOOR (Off) | " | LD | | |
| | | | | |
| MODE CONTROL | | | | |
| @ CARD only MODE | " | CM | | |
| @ CARD + PIN Mode | " | CP | | |
| @ CUstomer Code Only (No trans. storage) | " | CU | | |
| @ CUSTOMER Code Only (STORE Card Trans.) | " | CS | | |
| DISABLE ANTIPASSBACK | " | DA | | |
| ENABLE ANTIPASSBACK | " | EA | | |
| | | | | |
| AUXILIARY RELAYS | | | | |
| PULSE Aux RELAY "X" (Momentary operate) | $ | XP | TT | TT = Operate Time, 01-99 seconds |
| Aux Relay "X" oN | " | XN | | |
| Aux Relay "X" oFf | " | XF | | |
| PULSE Aux RELAY "Y" (Momentary operate) | $ | YP | TT | TT = Operate Time, 01-99 seconds |
| Aux Relay "Y" oN | " | YN | | |
| Aux Relay "Y" oFf | " | YF | | |
| | | | | |
| DATA REQUESTS | | | | |
| READER STATUS | " | RS | | |
| MICROMODE STATUS | " | MS | | |
| Monitor POINT STATUS Request | " | PS | | |
| READER ALARMS | " | RA | | |
| MICROMODE ALARMS (from both readers) | " | MA | | |
| READER TRANSACTIONS | " | RT | | |
| MICROMODE TRANSACTIONS (from both readers) | " | MT | | |
| RETRANSMIT REQUEST (Retransmit last message) | " | RR | | |

MICRONODE ---> COMPUTER

| STX | 9 DESTINATION | 9 SOURCE ADDR | 00 to 99 No of Data Chars | No of<br>RESPONSE<br>0-Z 0-Z | <------- UP TO 94 DATA CHARACTERS -------><br>ALPHANUMERIC DATA | CRCC |
|-----|---------------|---------------|---------------------------|------------------------------|-------------------------------------------------------------------|------|

| RESPONSE from MICRONODE | Symbol for # of Data Chars RSP | DATA | DESCRIPTION | | |
|---|---|---|---|---|---|
| CARD TRANSACTION | . CT | CCCCCCADTTTT | CC = Card Number | 000000-999999 | { V = VALID transaction }<br>{ X = wrong Customer Code }<br>{ U = UNKNOWN card }<br>{ T = wrong TIME }<br>{ P = PIN entry error }<br>{ Z = Card Number deleted, }<br>{     excessive PIN errors }<br>{ A = ANTIPSBK violation } |
|  |  |  | A = Activity Code | ----------------> |  |
|  |  |  | D = Day Code | 1-7 |  |
|  |  |  | TTTT = Time | 0000-2359 |  |

ABNORMAL CONDITIONS

| DOOR FORCED Open | ' DF | DTTTT | D = Day code | 1-7 |
|---|---|---|---|---|
| DOOR OPEN Too Long | ' DO | DTTTT | TTTT = Time | 0000-2359 |
| DOOR CLOSED | ' DC | DTTTT | | |
| TAMPER SWITCH Open | ' TS | DTTTT | | |
| TAMPER Switch NORMAL | ' TN | DTTTT | | |

CONTACT MONITORING

| POINT OPEN | ( PO | PDTTTT | P = Point number | 1-8 |
|---|---|---|---|---|
| POINT CLOSED | ( PC | PDTTTT | D = Day Code | 1-7 |
| | | | TTTT = Time Code | 0000-2359 |

RESPONSE TO COMMANDS

' xx  The Micronode responds to any computer message by returning a two character data field with the same two letter command mnemonic that it received.

NO ACTIVITY TO REPORT

' ZZ

| RESPONSE from MICRONODE | Symbol for # of Data Chars RSP | DATA | DESCRIPTION | | |
|---|---|---|---|---|---|
| MICRONODE STATUS Report | ' MS | abaxy | a - Micronode messages<br>N = NOTHING to report<br>G = GLOBAL message received<br>A = ALARM message pending<br>B = BOTH Global message received and Alarm message pending<br>C = Send CARD File<br>T = Send TIME Code File<br>H = Send HOLIDAY File | | b - Buffer status<br>E = Buffer EMPTY<br>< = Buffer < 75% full<br>> = 75% < Buffer < full<br>F = Buffer FULL<br><br>x - Auxilary Relay "X"<br>N = Relay oN<br>F = Relay oF |
|  |  |  | a - Antipassback Status<br>E = Antipassback ENABLED<br>D = Antipassback DISABLED | | y - Auxilary Relay "Y"<br>N = Relay oN<br>F = Relay oF |

| | | | | |
|---|---|---|---|---|
| READER/DOOR STATUS Report | & RS | MTLD | M - Reader Mode ------------<br>C = CARD only mode<br>P = PIN and Card mode<br>U = CUSTOMER CODE only<br>    no transactions stored<br>S = CUSTOMER Code only<br>    transactions STORED<br>n = NO reader connected | L - Lock Status -------<br>L = LOCKED<br>U = UNLOCKED |
| | | | T - Reader Tamper Switch -----<br>C = Switch CLOSED<br>O = Switch OPEN<br>n = NO reader connected | D - Door Status ------------<br>C = Door CLOSED<br>O = Door OPEN |
| Monitor POINT STATUS Report | * PS | 12345678 | 1-8 - Monitor Contact Status-------<br>O = Contact OPEN<br>C = Contact CLOSED | |

TROUBLESHOOTING MESSAGES

| | COMMANDS from COMPUTER | Symbol for # of Data Chars_ CMD | DATA | DESCRIPTION |
|---|---|---|---|---|

VERIFICATION COMMANDS from COMPUTER

| | | | | |
|---|---|---|---|---|
| @ | VERIFY a CARD NUMBER | ( VC | CCCCCC | CC = Card Number 000000-999999 |
| | VERIFY a TIME Code | % VT | TTE | TT = Time Code 01-63<br>E = Entry number 1-9 |
| | VERIFY a HOLIDAY | & VH | MMDD | MM = Month 01-12<br>DD = Day 01-31 |
| | VERIFY Monitor POINT Alarm State | * VP | | |
| @ | VERIFY LOGIC Definitions | * VL | | |
| | VERIFY cUSTOMER Code | * VU | | |
| | VERIFY Calendar/clocK | * VK | | |
| @ | VERIFY DOOR TIMES | * VD | | |
| | FORCE INITIALIZATION | * FI | | |
| | FLUSH BUFFER | * FB | | |
| @ | PULSE ALARM Relay | * PA | | |

TROUBLESHOOTING MESSAGES

| RESPONSE from MICROMODE | Symbol for # of Data Chars RSP | DATA | DESCRIPTION |
|---|---|---|---|
| VERIFICATION RESPONSES from microMODE | | | |
| VERIFYING a CARD | . VC | CCCCCCTTPPPP | CC = Card Number 000000-999999<br>TT = Time Code 01-63<br>PPPP = PIN Number 0000-9999 |
| | ± VC | CCCCCCZZ | ZZ = Card Number not found |
| VERIFYING a TIME Code | / VT | TTExySSSSssss | TT = Time Code 01-63<br>E = Entry Number<br>xy = Active Days (see table)<br>SSSS = Start Time 0000-2359<br>ssss = Stop Time 0000-2359 |
| | ' VT | TTEZZ | ZZ = Entry not found |
| VERIFYING a HOLIDAY | & VH | MMDD | MM = Month 01-12<br>DD = Day 01-31 |
| | ( VH | MMDDZZ | ZZ = Entry not found |
| VERIFYING Monitor POINT Alarm State | ± VP | 12345678 | 1 (Pt.1) .... 8 (Pt.8)<br>1 - 8 = O for OPEN contact is alarm state<br>= C for CLOSED contact is alarm state<br>= B for BOTH open/closed are alarm states<br>= N for this point is NOT an alarm<br>= D for DISABLED |
| VERIFYING LOGIC Definitions | . VL | VXUTPZAFOCSN | Upper case letter = function is an ALARM<br>Lower case letter = function is an EVENT<br>D = function is DISABLED<br>V = VALID Card Transaction<br>X = Wrong Customer Code<br>U = UNKNOWN Card<br>T = Card used at wrong TIME<br>P = Wrong PIN entered<br>Z = Card Number deleted, excessive PIN errors<br>A = ANTIPASSBACK violation<br>F = Door FORCED open<br>O = Door OPEN too long<br>C = Door CLOSED<br>S = Tamper SWITCH Open<br>N = Tamper Switch NORMAL (Closed) |

TROUBLESHOOTING MESSAGES

| RESPONSE from MICRONODE | Symbol for # of Data Chars | RSP | DATA | DESCRIPTION | | |
|---|---|---|---|---|---|---|
| VERIFICATION RESPONSES from microNODE | | | | | | |
| VERIFYING cUSTOMER Code | ( | VU | CCCCCC | CC = Customer Code | 000000 - 999999 | |
| VERIFYING Calendar/clocK | - | VK | YYMMDDWHHmm | YY = Year | (19)85-(20)84 | |
| | | | | MM = Month | 01-12 | |
| | | | | DD = Day | 01-31 | |
| | | | | W = Day-of-week | 1=Monday, 2=Tuesday, etc. | |
| | | | | HH = Hours | 00-23 | |
| | | | | mm = Minutes | 00-59 | |
| VERIFYING DOOR TIMES | & | VD | UUOO | UU = Unlock time | 01-99 secs | |
| | | | | OO = Open time | 01-99 secs | |

What is claimed is:

1. A loop network comprising a plurality of micronodes and a central processor, said network including first and second transmission lines connected to said plurality of micronodes and said central processor, each of said lines being constructed and interconnected to transmit signals in first and second directions, said central processor including means responsive to a first command from said central processor in a first direction on said lines to transmit a next succeeding command only in a second direction, each of said micronodes being responsive to a command from said central processor in a first direction to transmit a response in a second direction on said lines.

2. A network in accordance with claim 1, wherein said plurality of micronodes includes a target micronode and each of said micronodes includes first and second I-O (input-output) pairs, said network including means responsive to an identification code identifying said target micronode for said target micronode for transmitting a response via the output port of the I-O pair at which a successive presiding command was received.

3. A network in accordance with claim 2, wherein each of said first and second I-O pairs includes an input port and an output port and said central processor includes means for transmitting commands alternatively from said output port of said first I-O pair and the output port of said second I-O pair during alternate cycles of operation.

4. A network in accordance with claim 3, wherein each of said micronodes is adapted for connection to a code reader, and includes means responsive to codes entered at said reader for controlling access to a restricted area.

5. A network in accordance with claim 4, wherein each of said micronodes is adapted to read a magnetic card and includes a keyboard for entering a confirmation code.

6. A network in accordance with claim 5, wherein each of said micronodes includes a transaction buffer in which consecutive transactions are stored sequentially.

7. A network in accordance with claim 5, wherein said central processor is adapted to transmit commands to a selected one of said micronodes for transmitting the contents of said transaction buffer thereto.

8. A loop transmission network comprising a plurality of micronodes and a central processor, each of said micronodes and said central processor having first and second input-output (I-O) port pairs, said central processor including means responsive to a command transmitted from said central processor to a target one of said plurality of micronodes in a first direction around said loop during a first cycle of operation to transmit a next successive command only in a second direction around said loop during a next cycle, said micronodes being responsive to a command in a first direction in said loop to transmit a response only in an opposite direction in said loop.

* * * * *